United States Patent [19]

Feamster, III

[11] 3,795,051

[45] Mar. 5, 1974

[54] TANGENTIAL FEED PIPE CUTTER

[76] Inventor: William C. Feamster, III, 311 Saunders Dr., Portsmouth, Va. 23701

[22] Filed: July 11, 1972

[21] Appl. No.: 270,707

[52] U.S. Cl. ................................................. 30/101
[51] Int. Cl............................................ B23d 21/08
[58] Field of Search .... 30/90.1, 91.2, 92.93, 94, 95, 30/96, 98, 99, 101, 102; 81/182

[56] References Cited
UNITED STATES PATENTS

| | | | |
|---|---|---|---|
| 2,622,323 | 12/1952 | Grimaldi | 30/101 |
| 971,033 | 9/1910 | Ford | 30/102 |
| 2,752,676 | 7/1956 | Trickle | 30/95 |
| 2,796,663 | 6/1957 | Karnes | 30/102 |

Primary Examiner—James L. Jones, Jr.
Assistant Examiner—Mark S. Bicks
Attorney, Agent, or Firm—Mason, Fenwick & Lawrence

[57] ABSTRACT

A tangential feed pipe cutter capable of cutting pipe in restricted spaces, formed of two semi-circular annular body segments hinged together to form a ring for encircling the pipe to be cut. Two pairs of rollers journaled in one of the segments engage the pipe at two roller contact points at circumferentially spaced locations on the pipe surface and a cutting wheel or blade for contacting the pipe at a contact point opposite the midregion between the rollers is slidable in the other segment and adjusted by a feed screw and feed nut along a rectilinear path paralleling a line connecting the two roller contact points.

14 Claims, 5 Drawing Figures

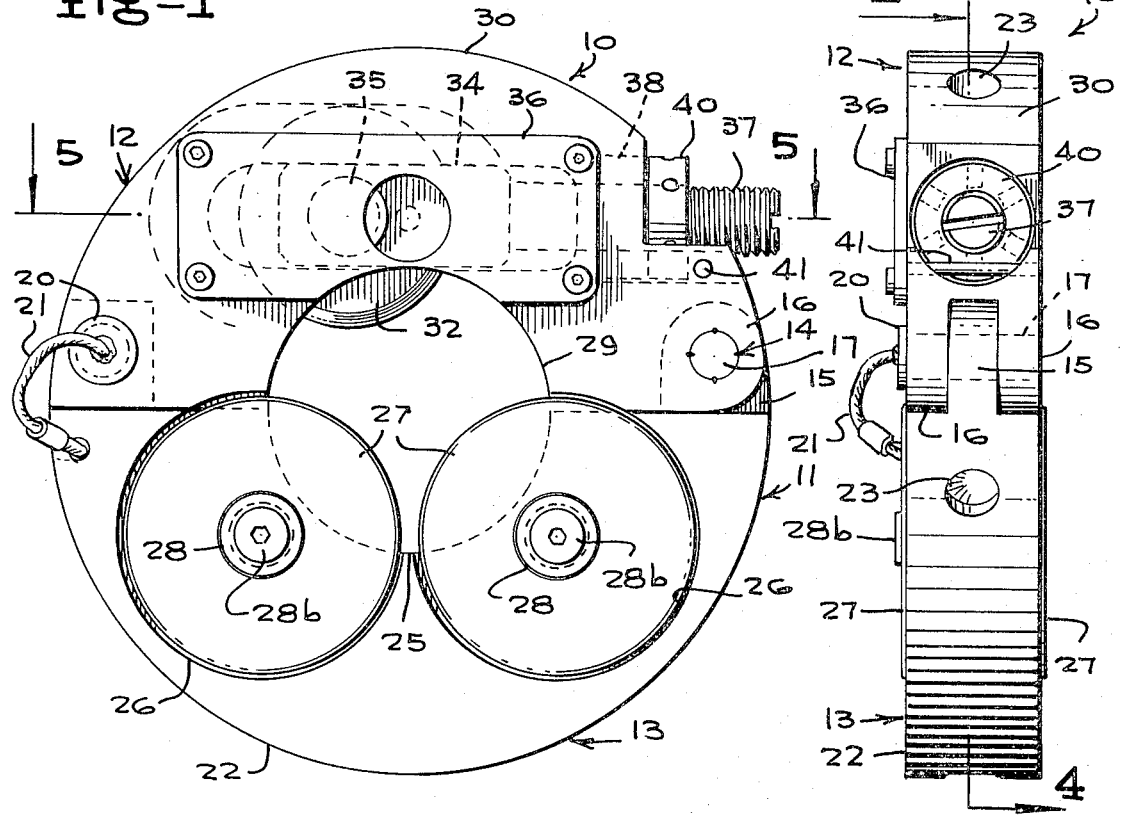
Fig-1
Fig-2
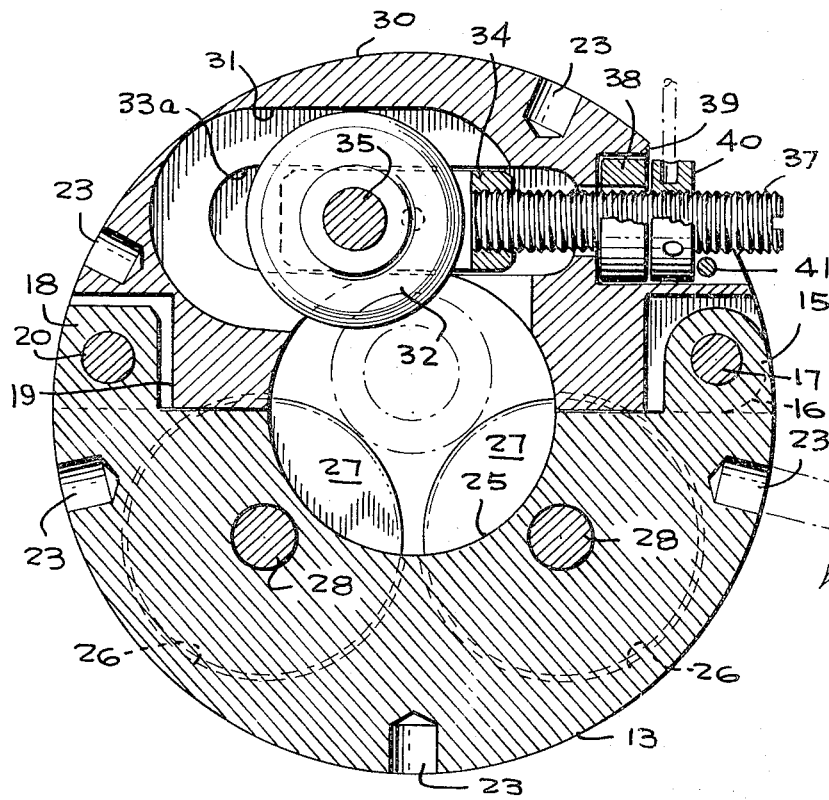
Fig-4

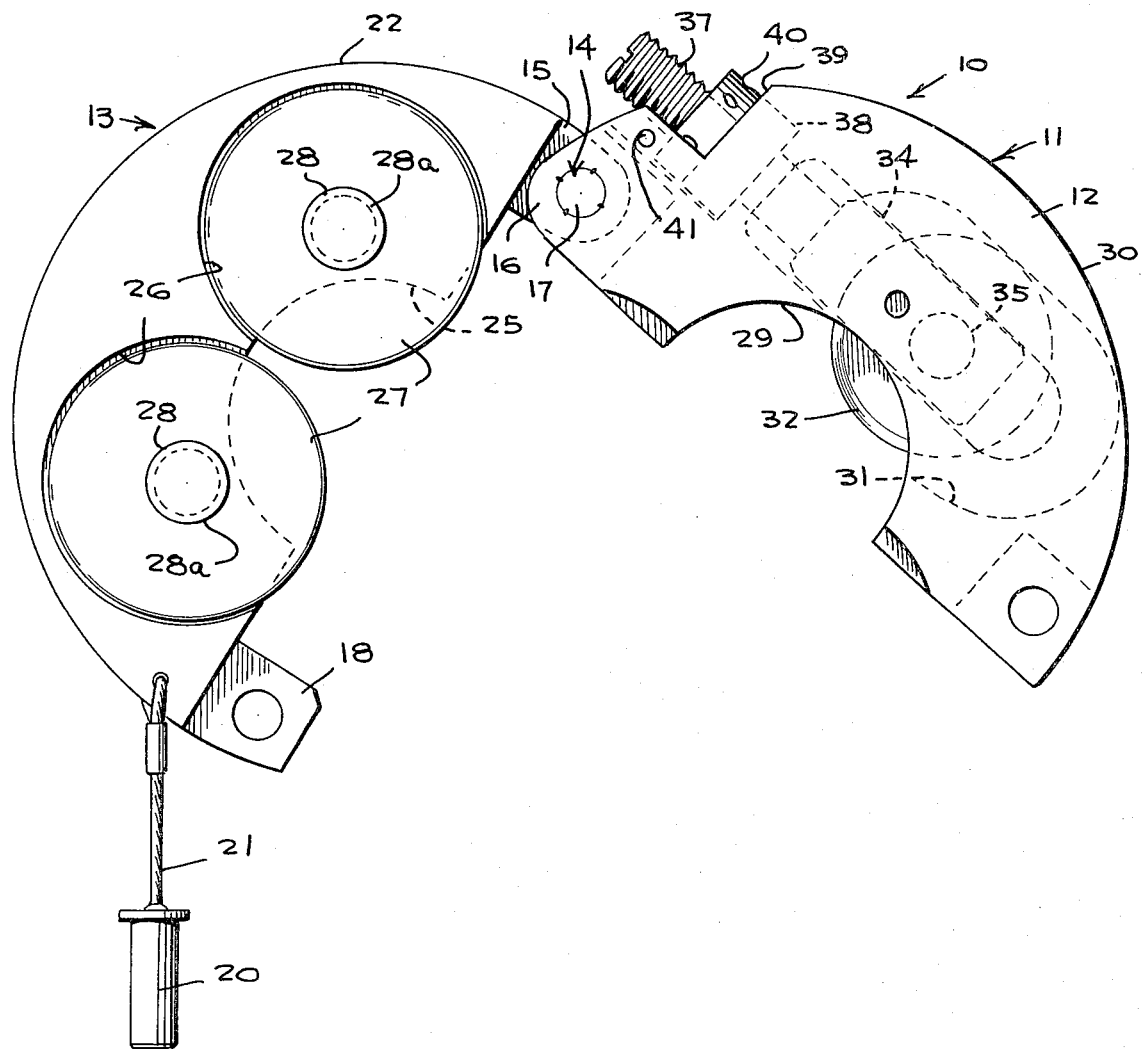
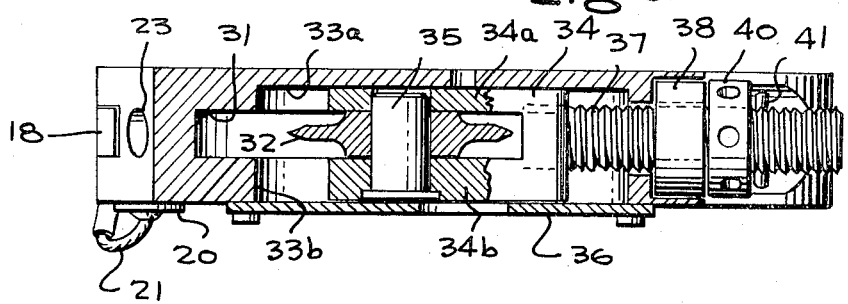

3,795,051

TANGENTIAL FEED PIPE CUTTER

BACKGROUND AND OBJECTS OF THE INVENTION

The present invention relates in general to pipe cutting tools, and more particularly to a tangential feed pipe cutter designed to allow cutting of pipe or pipe butt welded joints quickly, simply, and without contamination, in restricted locations.

Heretofore, the customary or conventional type of pipe cutter used for cutting pipe or pipe butt welded joints included a C-shaped or hook-shaped member having an opening large enough to permit it to be placed around a pipe and having a pair of idler rollers at circumferentially spaced locations in the upper portion of the C-shaped member and a cutter wheel in the lower portion of the C-shaped member to contact the pipe at three circumferentially spaced regions. The cutter wheel was adjustable toward the center of the pipe by means of a threaded screw and handle arrangement extending radially from the center of the C-shaped member for a substantial distance. Obviously such a device required considerable radial clearance to accommodate movement of the handle and adjustment of the handle for positioning the cutter.

Also one of the widely used conventional methods for cutting pipe required two or more inches of straight pipe on one side of the prospective cut and above three inches of radial clearance for a machine that was expensive to build and required considerable training to use. An alternate method was to use a hand-held grinder, which produced considerable debris and metal particles likely to contaminate the system. Both of these commonly used prior art methods are extremely slow and require a great deal of training time.

An object of the present invention is the provision of a novel pipe cutting device providing for feed of the cutting wheel along a rectilinear feed axis which substantially parallels a tangent to the cutter wheel contact point with the pipe at the position of maximum cutting depth and parallels the line connecting two circumferentially spaced contact points of a pair of rollers with the pipe which is extremely compact in construction, requiring only about thirteen-thirty-seconds inches off straight pipe on each side of the cut and less than 2 inches of radial clearance, which is capable of cutting pipe and pipe butt welded joints quickly and simply, with minimum contamination, in highly restricted locations, and which operators can be readily trained to use. A particular application of the cutter is for cutting pipe on nuclear vessels, where space restrictions impose a constant problem in gaining accessibility to the pipe to be cut, and wherein there are strict requirements against contamination of the system in which the pipe is incorporated.

Another disadvantage of standard tubing cutters as customarily used in the art is that the configuration of the rollers opposite of the cutting blade on the regular tubing cutter would tend to force displaced metal from the pipe back into the area of the cut. Also such tubing cutters currently employed commercially are so constructed as to allow feeding or advancing the cutter blade into the pipe without moving the relative contact point on the cutter blade in relation to the pipe being cut.

Another object of the present invention is the provision of a pipe wherein the rollers opposite the cutter wheel or cutter blade are spaced far enough apart axially of the pipe to eliminate the forcing of displaced metal back into the area of the cut, and the relative contact point on the cutter blade is moved upon tangential advancing of the blade to a different contact point on the pipe being cut to thereby reduce the possibility of blade breakdown, thus increasing blade life, and the possibility of subsequent work hardness from using a dull blade is decreased.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a side elevation view of the tangential feed pipe cutter of the present invention, shown in closed position;

FIG. 2 is an end elevation view thereof, viewed from the right of FIG. 1;

FIG. 3 is an elevation view similar to FIG. 1, showing the pipe cutter in open position ready to be installed about a pipe to be cut;

FIG. 4 is a section view of the pipe cutter, taken along line 4—4 of FIG. 2; and FIG. 5 is a section view taken along the line 5—5 of FIG. 1.

DETAILED DESCRIPTION OF A PREFERRED EMBODIMENT

Referring to the drawings wherein like reference characters designate corrsponding parts throughout the several figures, the tangential feed pipe cutter of the present invention is indicated generally by the reference character 10 and comprises, in the closed position which it occupies when assembled about a pipe, an annular, generally circular ring shaped body 11 formed basically of an upper semi-circular annular body segment 12 and a lower semi-circular annular body segment 13 which mate to form the ring shaped body 11. The two body segments 12 and 13 are pivotally joined together at one end by a hinge joint, generally indicated at 14, formed of an apertured hinge ear 15 projecting upwardly from the lower body segment 13 into a recess in the confronting corner portion of the body segment 13. This recess defines, in effect, apertured, hinged knuckle formations 16 flanking the hinge ear 15, through which a hinge pin 17 is fitted to complete the hinge joint. At the opposite end of the lower body segment 13, an apertured locking ear 18 is provided which extends upwardly into an accomodating recess 19 in the confronting corner portion of the upper body segment 12, defining flanking apertured corner portions of the upper body segment 12 through which a locking pin 20 is removably fitted. To prevent accidental loss of the locking pin 20, it is preferably coupled to the lower body segment 13 by a lanyard, chain, or similar fastening element 21 fixed at one end to the locking pin 20 and at its other end to the lower body segment 13.

The lower body segment 13 has a semi-cylindrical outer wall 22 interrupted by a plural circumferentially spaced sockets 23, providing rotation holes into which the end of a removable radius rod 24 may be fitted, where necessary, to increase leverage and facilitate rotating the cutter about the pipe to be cut. The inner semi-cylindrical wall 25 of the lower body segment 13 is concentric with the outer semi-cylindrical wall 22 and is of appropriate diameter to accommodate pipes of the desired size therein. In one example the radius of the outer wall 22 is about 2 inches and the radius of the inner wall 25 is about thirteen-sixteenths inch. A pair of wells 26 of outwardly facing, interrupted cylindrical configuration communicating over a substantial portion of the circumference of each with the semi-circular inner wall 25 are provided in each of the two opposite side walls of the lower body segment 13 to house a pair of rollers 27 at each side of the lower body segment 13. In the preferred embodiment, the roller 27 are solid annular cylindrical rollers having central openings through which a roller pin 28 having a slightly enlarged diameter head 28 a is projected and extends through a similar diameter journal opening in the body segment 13. A pin retainer washer 28b is secured, as by a screw extending into a threaded opening, in the end of the roller pin 28 to complete the assembly of a pair of rollers and their associated roller pin. If desired, ball-bearing type rollers or other conventional types of rollers can be used, although the solid annular cylindrical rollers have been found more desirable than ball-bearing rollers to avoid breakdown of the ball-bearings.

By having different sets of four rollers each of different diameters, the same feed cutter may be employed for different sizes of pipe. In a preferred embodiment, the wells 26 may have a diameter of about 1.546 inches and be about 0.250 inch deep, and three sets of rollers 27 may be provided. One set of rollers may have a diameter of 1.531 inches for use with ½ inch diameter pipe, another set may have a diameter of 1.342 inches for ¾ inch pipe and a third set may have a diameter of 0.853 inch for use with 1 inch pipe.

The upper body segment 12 has a semi-cylindrical inner wall 29 of the same diameter as the lower body segment inner wall 25, and a semi-cylindrical outer wall 30 of the same diameter as the lower body segment outer wall 22. The upper segment 12 has an interior, elongated chamber 31 having rounded ends and having a lower portion opening through the upper segment inner wall 29, to accommodate a cutter wheel or circular cutter blade 32 of a range of positions along an axis parallel to a tangent of an adjacent zone of the inner wall 29, and therefore of the confronting pipe portion to be cut. Communicating with a portion of the elongated cutter wheel chamber 31 are narrower, elongated lateral extensions 33a and 33b extending from one side of the chamber 31 toward, but not entirely to, one of the side walls of the upper body segment 12 and the other of which opens through the opposite side wall of the upper body segment 12. These chambers may be modified, for production purposes, without changing the intent of the device itself.

The extension chamber portions 33a and 33b form centrally located lateral enlargements of the chamber 31 and are designed to slideably accommodate a yoke member 34 and guide the latter for movement along the cutter reciprocation axis paralleling the tangent to the adjacent inner wall portion 29 and the confronting surface of the pipe to be cut. The yoke member 34 has a pair of arms or side portions 34a and 34b designed to embrace the cutter wheel 32 therebetween, and apertured to receive a cutter wheel pin 35 which has a slightly enlarged head. Assembly of these components is facilitated by the arrangement described, the yoke member 34 being insertable into the extension chamber portions 33a and 33b by introducing it laterally through the wall of the body segment 12 through which the extension chamber 33b opens. The cutter wheel 32 can then be inserted into the recess between the yoke member arms 34a and 34b by introducing it upwardly through the opening defined where the chamber 31 communicates with the inner wall 29, after which the cutter wheel pin 35 can be inserted through the extension chamber 33b into the openings therefor in the yoke arms and the cutter wheel. The yoke and the cutter wheel pin are then held in place by fastening the cover plate 36 over the extension chamber portion 33b, the cover plate being held in place by suitable fasteners such as conventional threaded screws.

The yoke 34 has a threaded socket in the right-hand end thereof, as viewed in FIGS. 4 and 5, in which is fixed a feed screw 37 which extends through a circular bore in the upper body segment 12 communicating with the extension chambers 33a and 33b and through a bearing 38 to an exposed position beyond a cutout 39 in the outer wall portion of the body segment 12. An internally threaded feed nut 40 is threaded onto the feed screw 37 to bear against the bearing 38 and may be held in position in a concave, substantially semi-circular lower wall portion of the cutout 39 by retaining pin 41 as illustrated. The feed nut 40 has a plurality of circumferentially spaced sockets for receiving the end of an operating or feed rod to facilitate turning of the feed nut when desired.

To install the tangential feed cutter on the pipe, the locking pin 20 is removed from the holes therefor in the upper body segment 12 and the locking ear 19, and the body segments 12 and 13 are pivoted open about the hinge pin 17. With the cutter blade in the normal limit position illustrated in solid lines in FIG. 4, the pipe cutter is placed around the pipe, the body segments 12 and 13 are pivoted towards each other to form a closed ring, and the locking pin 20 is reinstalled. The cutter blade 32 is then advanced to the desired cutting location by rotating the feed nut or feed knob 40 in an appropriate direction to pull to cutter blade 32 into contact with the pipe to be cut. While maintaining light pressure on the pipe with the cutter blade 32, the ring-shaped body 11 is then rotated through 360° on the pipe to verify tracking of the cutter blade 32 and create a true cutting circle. Using an operating rod or feed rod, for example a rod about 2 inches long having a ⅛ inch diameter, inserted into the sockets in the periphery of the feed nut 40, the feed nut is rotated to increase the cutter blade pressure on the pipe and the ring-shaped body is rotated about the pipe to be cut, inserting the radius rod 24 into the sockets 23, where necessary for increased leverge. Rotation of the cutter body 12 is repeated while continuing to advance the cutter blade 32 into the pipe with the feed knob 40 until the desired degree of penetration or severance is achieved.

By reason of the substantially tangential feed of the cutter blade relative to the surface of the pipe along the rectilinear feed axis paralleling the line between the contact points of the two rollers 27 with the pipe, and by reason of the arrangement of the feed screw to pull rather than push the cutter wheel into the pipe, greater control of the device is made available, considerable saving in space is achieved compared with the use of radial feed screws or handles, thus permitting the cutting device to be used in highly restricted spaces, and the force needed to operate the roller cutter is reduced, while increasing cutter blade life. The axial spacing of the rollers 27 of each connected pair of rollers is such as to dispose the rollers outwardly from the ridges of displaced metal formed by the cutting blade so that the rollers do not tend to force the displaced metal back into the area of the cut as occurs in regular tubing cutters. Also, by virtue of the separation of the rollers of each pair located opposite the cutting blade, dust and flaking are considerably reduced, therefore reducing contamination of the system with the use of the tangential feed cutter. Also, due to the tangential feed arrangement, the cutter blade is forced to rotate when it is adjusted progressively to deeper positions in the pipe, thereby constantly changing the contact point between the pipe surface and the cutter blade.

I claim:

1. A pipe cutter capable of use in severely restricted spaces, comprising a pair of substantially semicircular annular body segments adapted to collectively form a closed annular ring to encircle a pipe and having a center opening for receiving the pipe, means hinging the body segments together at one end thereof for pivotal movement between open and closed positions about a hinge axis, means for releasably locking the segments in closed position, a pair of rollers journaled in one of the segments projecting into the center opening to bear against the exterior surface of the pipe to be cut at two roller contact points at circumferentially spaced locations on the pipe surface, a cutter wheel rotatably mounted in the other segment to project into the center opening and contact the surface of the pipe therein substantially opposite the mid-region between said roller contact points, cutter support means supporting the cutter wheel for reciprocative translatory movement in said other segment confined to a rectilinear path paralleling a line connecting said two roller contact points, and cutter feed means for adjusting the position of the cutter wheel along said path.

2. A pipe cutter as defined in claim 1, wherein said cutter support means and feed means comprise a yoke member having journal means for rotatably supporting said cutter wheel, and said other body segment having an internal chamber defining guide surfaces for slidably guiding said yoke member for movement along said rectilinear path upon actuation of said feed means.

3. A pipe cutter as defined in claim 1, wherein said feed means includes a feed screw rotatably supported in said other segment in axial alinement with said path and coupled at one end to said cutter support means, and a feed nut threaded on said feed screw and bearing against a surface of said other body segment for rotation about the feed screw axis to axially move the feed screw in a direction to pull the cutter wheel progressively toward the pipe surface and draw the cutter wheel further into the center opening to increase the depth of cut.

4. A pipe cutter as defined in claim 2, wherein said feed means includes a feed screw rotatably supported in said other segment in axial alinement with said path and coupled at one end to said yoke member, a thrust bearing mounted in said other segment and a feed nut threaded on said feed screw and bearing against said thrust bearing for rotation about the feed screw axis to axially move the feed screw in a direction to pull the cutter wheel progressively further into the center opening toward said thrust bearing to increase the depth of cut.

5. A pipe cutter as defined in claim 1, wherein said feed means includes feed screw means coupled to the cutter wheel and rotatable means threaded thereon for drawing the feed screw axially outwardly along said path and thereby pulling the cutter wheel toward the pipe surface to make progressively deeper cuts therein.

6. A pipe cutter as defined in claim 2, wherein said feed means includes feed screw means coupled to the yoke member and rotatable drive means threaded thereon and located at the periphery of the ring for drawing the feed screw axially outwardly and thereby pulling the cutting wheel toward the rotatable drive means and toward the pipe surface to progressively form and deepen the cut therein.

7. A pipe cutter as defined in claim 1 wherein said body segments each have semi-cylindrical outer peripheries which collectively define an interrupted cylinder when the two body segments are in closed position, said outer peripheries of the body segments having a series of circumferentially spaced, outwardly opening sockets for removably receiving the end portion of a radius rod to be manipulated by an operator in turning the annular ring about the pipe to be cut.

8. A pipe cutter as defined in claim 3 wherein said body segments each have semi-cylindrical outer peripheries which collectively define an interrupted cylinder when the two body segments are in closed position, said outer peripheries of the body segments having a series of circumferentially spaced, outwardly opening sockets for removably receiving the end portion of a radius rod to be manipulated by an operator in turning the annular ring about the pipe to be cut, and said feed nut being located immediately at the outer periphery of said other segment with only a minor portion of the length of the feed screw projecting beyond said outer periphery when the cutting wheel engages the pipe surface.

9. A pipe cutter as defined in claim 5 wherein said body segments each have semi-cylindrical outer peripheries which collectively define an interrupted cylinder when the two body segments are in closed position, said outer peripheries of the body segments having a series of circumferentially spaced, outwardly opening sockets for removably receiving the end portion of a radius rod to be manipulated by an operator in turning the annular ring about the pipe to be cut, and said rotatable means being located immediately at the outer periphery of said other segment with only a minor portion of the length of the feed screw projecting beyond said outer periphery when the cutter wheel engages the pipe surface.

10. A pipe cutter as defined in claim 1 wherein said body segments have a line of separation therebetween along a diametric bisector of the ring and each have semi-cylindrical outer peripheries which collectively define an interrupted cylinder when the two body segments are in closed position, said rectilinear path paralleling said diametric bisector, and said cutter wheel having an inactive position wherein the cutting edge of the cutter wheel is substantially withdrawn into said other segment from said center opening and an active position wherein the cutter wheel projects into said center opening to engage the pipe to be cut, the cutter wheel being pulled from said inactive position to said active position upon adjustment of said cutter feed means to advance the cutter wheel toward the pipe.

11. A pipe cutter as defined in claim 3, wherein said body segments have a line of separation therebetween along a diametric bisector of the ring and each have semi-cylindrical outer peripheries which collectively define an interrupted cylinder when the two body segments are in closed position, said rectilinear path paralleling said diametric bisector, and said cutter wheel having an inactive position wherein the cutting edge of the cutter wheel is substantially withdrawn into said other segment from said center opening and an active position wherein the cutter wheel projects into said center opening to engage the pipe to be cut, the cutter wheel being pulled from said inactive position to said active position upon adjustment of said feed nut to advance the cutter wheel toward the pipe.

12. A pipe cutter as defined in claim 5, wherein said body segments have a line of separation therebetween along a diametric bisector of the ring and each have semi-cylindrical outer peripheries which collectively define an interrupted cylinder wnen the two body segments are in closed position, said rectilinear path paralleling said diametric bisector, and said cutter wheel having an inactive position wherein the cutting edge of the cutter wheel is substantially withdrawn into said other segment from said center opening and an active position wherein the cutter wheel projects into said center opening to engage the pipe to be cut, the cutter wheel being pulled from said inactive position to said active position upon adjustment of said rotatable means to advance the cutter wheel toward the pipe.

13. A pipe cutter as defined in claim 3 wherein said pair of rollers comprise two sets of two cylinder members forming each roller, the cylinder members of each respective set being coupled together by a shaft extending through and journaled in the one body segment and being located on opposite sides of the associated body segment, the two cylinder members of each set being spaced apart a distance to lie in outwardly flanking spaced relation to any ridges of metal raised from the pipe during cutting action of the cutter wheel.

14. A pipe cutter as defined in claim 6 wherein said pair of rollers comprise two sets of two cylinder members forming each roller, the cylinder members of each respective set being coupled together by a shaft extending through and journaled in the one body segment and being located on opposite sides of the associated body segment, the two cylinder members of each set being spaced apart a distance to lie in outwardly flanking spaced relation to any ridges of metal raised from thhe pipe during cutting action of the cutter wheel.

* * * * *